Dec. 10, 1968  B. VINZELBERG ETAL  3,415,997
RADIATION SENSITIVE AMPOULE TESTING APPARATUS AND METHOD
Filed May 28, 1965

INVENTORS:
BERNHARD VINZELBERG, KONRAD BUNGE.
BY
ATTORNEY

United States Patent Office 3,415,997
Patented Dec. 10, 1968

3,415,997
RADIATION SENSITIVE AMPOULE TESTING APPARATUS AND METHOD
Bernhard Vinzelberg, Leverkusen, and Konrad Bunge, Cologne-Stammheim, Germany, assignors to Farbenfabriken Bayer Aktiengesellschaft, Leverkusen, Germany, a corporation of Germany
Filed May 28, 1965, Ser. No. 459,680
Claims priority, application Germany, June 4, 1964, F 43,059
7 Claims. (Cl. 250—218)

ABSTRACT OF THE DISCLOSURE

Method and apparatus for testing ampoules for the presence of foreign matter therein including a holder for the ampoule and means to rotate the ampoule; a photoelectric means adapted to receive light rays emanating from the source transmitted through the ampoule near the base thereof and an amplifier recorder or other similar device associated with the photocell to inform and/or record the results of the light testing.

---

The invention relates to a method of and an apparatus for the objective testing of ampoules.

In the case of ampoules filled with liquids, for example solutions of pharmaceuticals, it often happens that undesired extraneous particles, such as dust, glass splinters and also crystals precipitated from the solution, are present in the liquid. Because ampoules contaminated by such extraneous particles have to be sorted out, each ampoule must be checked or tested. This is still being done subjectively with the familiar disadvantages of subjective testing methods.

Although there has been no shortage of attempts to develop objective ampoule testing apparatus, all the proposed systems, quite apart from their complexity and high cost, are attended by other disadvantages with the result that it is not always possible safely to detect all the various types of extraneous particles and errors. Since, in addition, the ampoules then have to be subjectively retested, any advantages systems of this type might afford are very small.

One difficulty involved in objective ampoule testing is that the extraneous particles in the ampoule liquid have to be distinguished from dust, scratches, writing etc. on the walls of the ampoule. According to the prior art, this was done by initially rotating the ampoule, in order to whirl any extraneous particles around inside it, and then stopping it. The extraneous particles in the ampoule are kept in motion for a while in relation to a fixed or stationary system, whilst, in contrast to this system, any objects on the walls of the ampoule remain stationary. This difference in movement is used to distinguish between the two types of objects.

One of the known ampoule testing apparatus employs a schlieren process (cf. German patent specification No. 1,099,211), in which case the extraneous particles can be detected in their surroundings by changes in the refractive index, and as light dots in dark surroundings by the light scattered from them. Such an arrangement requires a complicated, corrected optical system, and is extremely unreliable on account of the limited amount of light available.

In another ampoule-testing arrangement (cf. German patent specification No. 1,141,471), a light curtain is arranged parallel to the axis of the ampoule through which the extraneous particles move during rotation of the ampoule, and, in doing so, generate signals on account of the light scattered from them. Due to the fact that the regularly broken light has to be masked through a number of special screens, such an arrangement is very difficult to adjust. Above all, however, it is attended by the following disadvantage: in order to whirl the extraneous particles around, the liquid has to be set in vigorous motion, resulting in the formation of a strong vortex in the ampoule. If the ampoule is then stopped, the actual measuring operation cannot take place until the vortex has completely disappeared from the path of rays used for measurement. Since this time interval is not very much shorter than the time in which an extraneous particle can sink to an appreciable depth in the ampoule, it often happens that the extraneous particle to be detected has already descended to the bottom of the ampoule before measurement can be made. As a result, particularly conspicuous extraneous objects, for example relatively large glass splinters, cannot be observed.

This invention is embodied in an objectively measuring ampoule tester. An arrangement is used in which the ampoule is first of all set in rotation and is then stopped again. Such an arrangement has considerable advantages over known arrangements.

According to the invention, the light curtain is arranged perpendicularly of the axis of the ampoule closely over its bottom. It is produced in such a way that the rays of light are substantially parallel to one another inside the ampoule. This is done by arranging the light source of the image of the light source or of one of its components in a focal point of the ampoule which serves as a cylindrical lens.

The light leaving the ampoule is picked up by the photoelectric receiver (phototransistor, photodiode, etc.) either directly or via a lens system which can be of advantage in cases where the design of the ampoule is such that the photoelectric receiver cannot be mounted on or near it.

The use of light curtains for testing ampoules is known. In the arrangement according to the invention, the ampoule acts as an optical system which, because it is cylindrical, has a considerable effect on the ray path. Consequently, it is not possible to beam light in the form of parallel or substantially parallel rays on to the ampoule because that part of the light curtain reaching the receiver would not pass through the entire cross-section of the ampoule at all on account of refraction at the wall of the ampoule.

According to another aspect of the invention, the extraneous object or particle in the ampoule liquid is guided through the light curtain according to the invention as follows:

The ampoule is first of all rotated at high speed. The speed at which and period for which it is rotated are such that the peak of the vortex set up inside the liquid almost extends down to the bottom of the ampoule. As a result, the extraneous particles move towards the bottom of the ampoule. After the ampoule has been stopped, measurement is not made until the peak of the vortex is, for example, 1 to 2 mm. above the light curtain. This takes about 0.1 sec., after which the extraneous particles travel through the light curtain which is shown by a change in the flow of current in the photoelectric receiver. The resulting impulses whose amplitudes, for example, exceed an adjustable threshold of a following amplifier, represent extraneous particles whose size exceeds a specific value. It is possible, by suitable choice of the amplitude adjustment or setting, to indicate every harmful extraneous object or particle.

It might be surprising that extraneous matter can be reliably detected by means of the method and apparatus used according to the invention. According to the prior art, the signal obtained was only expected to stand out very slightly from the noise level of the photoelectric receiver. Since, however, the weakening of the direct light, and not a scattered light, is used for measurement, and since the light curtain has only to fill the relatively small cross-section of the ampoule, a high signal-noise ratio is obtained. By virtue of this advantage, which is not a feature of the known arrangements, in which the rays pass through the ampoule as a whole or a large part thereof, no substantial postamplification is necessary, and neither is the arrangement sensitive to ordinary light.

In addition, compared with the known arrangements, in which the extraneous particles are moved around the axis of the ampoule, the method according to the invention exploits a different property of the flow in the ampoule in order to move the extraneous particles to be detected through the light curtain. Since, when the ampoule is stopped, a flow is formed parallel and antiparallel to the axis of the ampoule as the vortex collapses, all the extraneous particles are guaranteed at least one passage through the light curtain.

Figure 1:
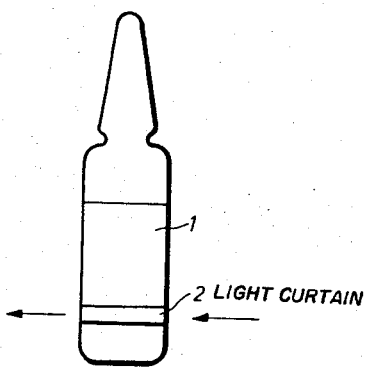
FIGS. 1 and 2 illustrate the ampoule tester according to the invention.
Figure 3:
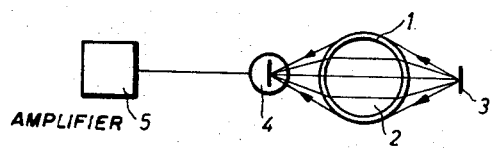
FIG. 3 is a sectional view taken through the light curtain in FIG. 1.

FIG. 1 diagrammatically illustrates (side elevation, top view) the position of the light curtain according to the invention relative to the ampoule. 1 is the ampoule, filled with liquid and 2 the light curtain above the bottom of the ampoule. The light source 3 is in one of the focal points of the ampoule 1 representing a cylindrical lens. 4 is the photoelectric receiver which acts on the amplifier 5.

Figure 2:
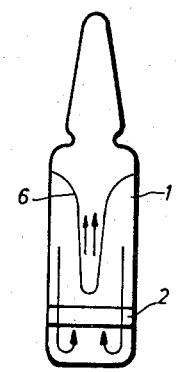

FIG. 2 illustrates the stage at which the ampoule 1 has been stopped and the vortex 6 has collapsed to such an extent that its peak is above the light curtain 2. The large arrows diagrammatically illustrate the direction of flow in the ampoule, whilst the small arrows indicate the direction in which the vortex collapses.

We claim:
1. A testing apparatus adapted to determine the presence of foreign matter in a liquid-containing substantially cylindrical substantially transparent ampoule which comprises a substantially cylindrical substantially transparent ampoule; a source of light at one of the foci of said cylinder so arranged as to be adapted to project light through said ampoule transverse to the axis thereof; a photosensitive receiver adapted to receive the light transmitted by said light source and positioned at a focus of said cylinder which is disposed substantially 180° from said light source focus; means to cause said ampoule to rotate about its axis and means to receive a signal transmitted by said photosensitive receiver.

2. A testing apparatus as claimed in claim 1, wherein said light source and said photosensitive receiver are positioned in a plane substantially perpendicular to said axis and wherein light emitted by said light source passes through said ampoule in substantially parallel rays.

3. A testing apparatus as claimed in claim 2, wherein said rays are disposed intermediate the bottom of said ampoule and the surface of the liquid contained therein when said liquid is at rest.

4. A testing apparatus as claimed in claim 3, wherein said rays are proximate to the bottom of said ampoule.

5. A method for testing the liquid contents of a substantially cylindrical and substantially transparent ampoule to determine if the liquid contents thereof contains foreign matter, which method comprises inserting said ampoule into a holding means therefor positioned between a light source at one focus of said cylindrical ampoule and a photoelectric receiver for said light positioned at the other focus of said cylindrical ampoule; rotating said ampoule about its axis at a speed sufficient to form in said liquid a vortex having its vertex between the plane of said light source and receiver and the bottom of said ampoule; slowing the rotation of said ampoule to such an extent that the vertex of said vortex rises in said ampoule to a position between said light source-receiver plane and the position of the surface of said liquid when said liquid is at rest; and measuring the light arranged in a plane transverse to the axis of the ampoule transmission through said liquid at such raised vertex position.

6. The method claimed in claim 5, wherein said slowed rotation of said ampoule is occasioned by eliminating a vortex causing rotational drive upon said ampoule.

7. The method claimed in claim 5, wherein said light transmission is measured electronically.

References Cited

UNITED STATES PATENTS

| | | | |
|---|---|---|---|
| 2,286,836 | 6/1942 | Sachtleben | 88—14 |
| 2,531,529 | 11/1950 | Price | 250—218 |
| 2,635,194 | 4/1953 | Kellogg et al. | 250—223 X |

WALTER STOLWEIN, *Primary Examiner.*

U.S. Cl. X.R.

88—14